United States Patent [19]

Stemmann et al.

[11] 4,113,074
[45] Sep. 12, 1978

[54] METHOD OF AND APPARATUS FOR REGULATING THE BRUSH CONTACT PRESSURE OF PANTOGRAPH ASSEMBLIES

[75] Inventors: Karl Stemmann; Gerhard Holtmeier, both of Schuettorf, Fed. Rep. of Germany

[73] Assignee: August Stemmann OHG, Schuettorf, Fed. Rep. of Germany

[21] Appl. No.: 688,269

[22] Filed: May 20, 1976

[30] Foreign Application Priority Data

May 23, 1975 [DE] Fed. Rep. of Germany ....... 2522876

[51] Int. Cl.² .............................................. B60L 5/12
[52] U.S. Cl. ......................................... 191/67; 191/66
[58] Field of Search ....................... 191/66, 67, 68, 69, 191/70, 85, 86, 87, 90

[56] References Cited

U.S. PATENT DOCUMENTS 3,349,197  10/1967  Scheidecker .......................... 191/67

FOREIGN PATENT DOCUMENTS 2,165,813  7/1973  Fed. Rep. of Germany ............. 191/67
968,340  9/1964  United Kingdom ...................... 191/66

Primary Examiner—Trygve M. Blix
Assistant Examiner—Reinhard J. Eisenzopf

[57] ABSTRACT

An improved technique for regulating the contact pressure of a pantograph brush on an overhead guide conductor is described. The brush is supported for vertical movement in a brush support member for adjustable wiping contact with the overhead conductor. The brush support member is in turn supported for movement in a vertical plane via a two-arm scissors arrangement which is supportable on the roof of an electric vehicle. A high-frequency signal picked up by a transducer situated in the area of the brush and representative of the instantaneous contact pressure of the brush on the wire is compared with an adjustable reference indication indicative of a desired contact pressure, and the resulting difference signal is employed to incrementally adjust the brush contact pressure. In addition, a separate low-frequency indication derived from such difference signal when the amplitude of such signal exceeds a predetermined value is employed to independently position the scissor member in a vertical direction, thereby providing a coarse adjustment of the brush position during relatively large-amplitude changes of the guide wire height.

8 Claims, 3 Drawing Figures

METHOD OF AND APPARATUS FOR REGULATING THE BRUSH CONTACT PRESSURE OF PANTOGRAPH ASSEMBLIES

BACKGROUND OF THE INVENTION

The invention relates to pantograph assemblies for supplying power from an overhead conductor to electrically-powered trains and other vehicles, and more particularly to methods of and apparatus for controlling the contact pressure of the contact brushes of the pantograph on the lower surface of the overhead conductor.

In pantograph assemblies of this general type, the brush is supported for vertical movement in a brush holder, which in turn is carried on the top of an upper link or rod of a scissors-type pivot structure associated with the top of the vehicle. Typically, the brush holder is hydraulically or pneumatically driveable, via a piston-cylinder set in a vertical direction with respect to a fixed-height scissors structure supporting it.

The hydraulic or pneumatic pressure is varied in correspondence to the deviation of an instantaneous contact pressure of the brush, which is sensed by a transducer carried on the brush holder, from a desired value of contact pressure represented by a reference signal.

Regulators of this type have been found to be insufficiently responsive to maintain the contact pressure within a desired range where, as in the usual case, the height of the overhead conductor above the top of the vehicle varies significantly in a random fashion as a function of distance along the path of movement of the vehicle.

SUMMARY OF THE INVENTION

These disadvantages are overcome with the pantograph brush contact regulator in accordance with the invention. Illustratively, the scissors assembly is made adjustable in the vertical plane, and a separate piston-cylinder set is associated with the lower rod or link of such scissors member for incrementally positioning the brush holder-carrying upper end of the scissors member via the application of pressure on the lower end of the lower link thereof. A separate, low-frequency control signal derived from the high-frequency difference signal associated with the brush-positioning movement is employed to drive the piston-cylinder set coupled to the scissor member, thereby providing a coarse adjustment of brush contact pressure, such adjustment being particularly effective in the presence of relatively gross changes in the height of the overhead rail. Such combination of low-frequency adjustment of the scissor member and high-frequency adjustment of the brush in the brush holder has been found to yield an optimum regulation characteristic even when the associated vehicle travels at extremely high speeds, e.g., in excess of 250 km/h.

In a feature of the invention, a pair of compression springs are individually associated with the separate cylinders of the brush holder and the scissor member to urge such members in the upward direction to assure contact of the brush with the rail.

In another feature of the invention, the reference signal with which the contact pressure signal sensed by the transducer on the brush holder is compared is itself made proportional to the vehicle speed to improve the dynamic regulation of the apparatus.

The coarse regulation of the scissor member may be instrumented on a continuous basis. Alternatively, the circuit for deriving the low-frequency indication from the high-frequency difference signal may be provided with suitable threshold means for inhibiting the generation of the low-frequency control signal when the peak amplitude of the high-frequency difference signal is below a predetermined value.

BRIEF DESCRIPTION OF THE DRAWING

The invention is further described in the following detailed description taken in conjunction with the appended drawing, in which.

DETAILED DESCRIPTION

Figure 1:
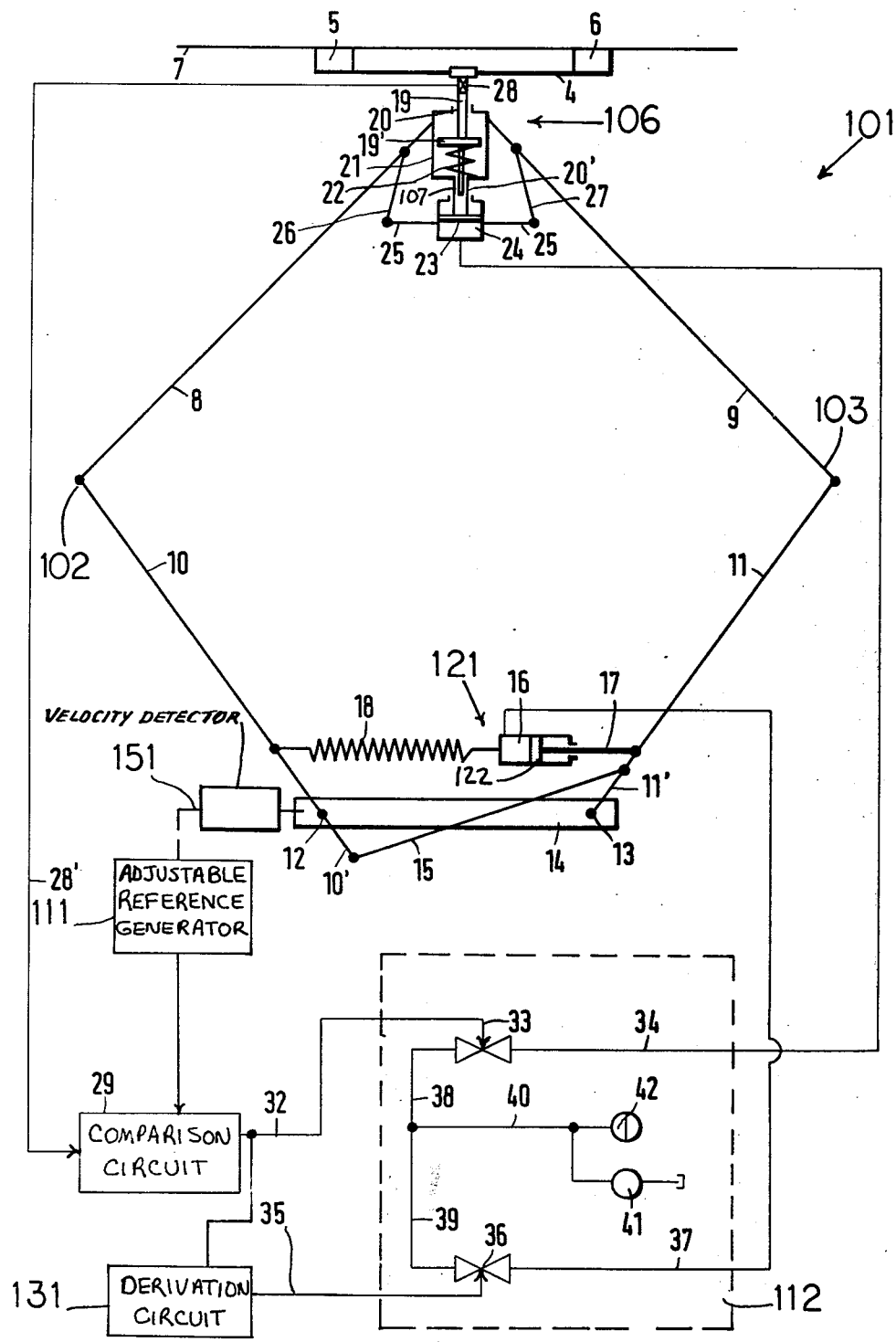
FIG. 1 is a side view of a first form of pantograph arrangement having facilities in accordance with the invention for regulating brush contact pressure.
Figure 2:
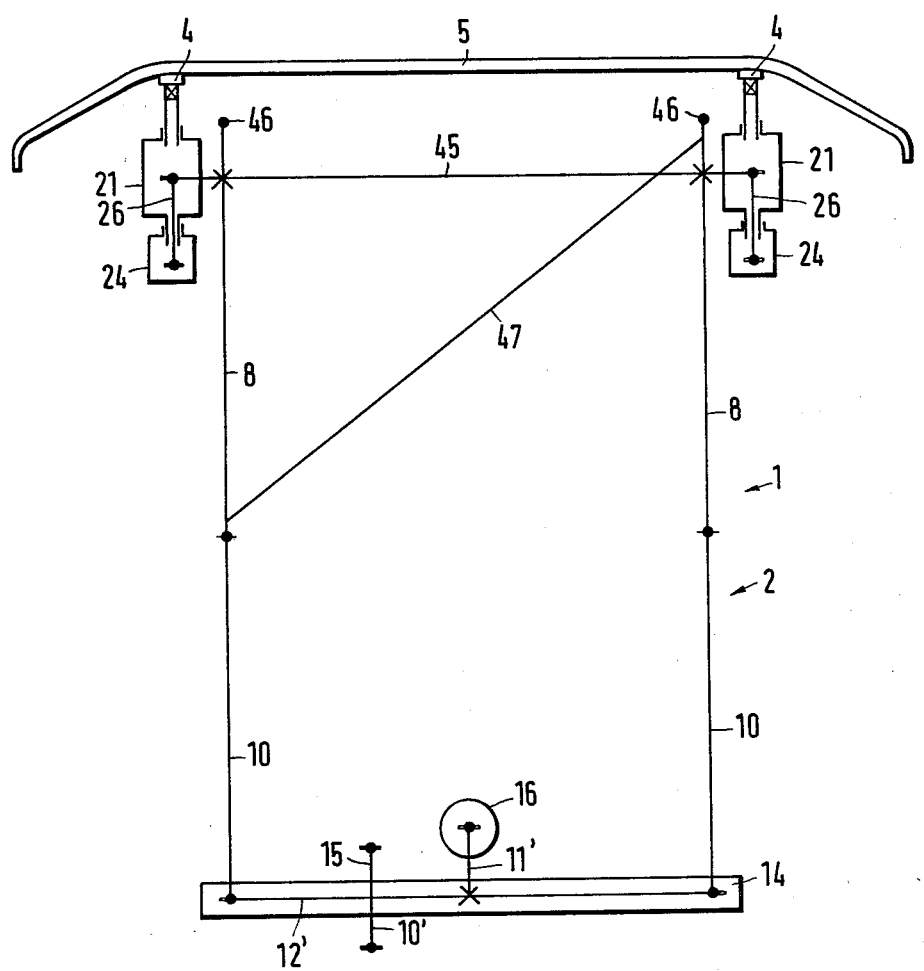
FIG. 2 is a front view of the arrangement of FIG. 1.

Referring now to the drawing, FIGS. 1 and 2 illustrate a first embodiment of pantograph arrangement 101 adapted to operate with the brush-contact regulation system in accordance with the invention. Typically, the assembly 101 includes one or more composite scissor members identified in the drawing as 8, 10 and 9, 11, respectively. Taking the scissor member 8, 10 as typical, the numeral 8 designates an upper elongated rod thereof that extends diagonally upwardly in a vertical plane from a pivot point 102, while the numeral 10 designates a lower elongated rod thereof which extends downwardly in the same plane.

A lower portion of the rod 10 is carried in a first support point 12 of a frame member 14, which in a typical case may be attached to a movable electric vehicle (not shown) which is to receive power from an overhead guide conductor 7 via the pantograph assembly 101.

As shown best in FIG. 2, a second, identical scissor member 8, 10 is disposed parallel to the scissor member 8, 10 shown in FIG. 1. The lower end of the second member 8, 10 is connected to the lower end of the lower rod 10 of the first scissor member by means of a link 12' extending through the support member 14 in a direction into the paper as viewed in FIG. 1. Similarly, the upper portions of the corresponding upper rods 8 of the spaced scissor members are connected by means of a link 45. Because of such connections, the spaced scissor members can execute synchronized movements in the vertical plane when a propelling force is applied in a horizontal direction to corresponding lower areas of the lower rods 10 in the manner described below.

The other scissor members 9, 11 illustrated in FIGS. 1 and 2 are disposed in complementary fashion to the scissor members 8 and 10 in the vertical plane. In particular, an upper rod 9 of each scissor member 9, 11 extends upwardly from a pivot point 103 opposite to pivot point 102 of the scissor element 8, 10, with the upwardly extending corresponding rods 8, 9 in each vertical plane remaining in spaced relation but converging toward a vertex point 46 below the guide wire 7. Similarly, a lower rod 11 of each of the elements 9, 11 extends downwardly from the pivot point 103 to a support point 13 in the member 14, with the lower ends of the respective rods 11 of the elements 9, 11 in the spaced vertical planes being joined by a horizontal member (not shown) corresponding to the member 12' in FIG. 2. It will be further understood that the upper portions of the corresponding upper rods 9 of the spaced scissor elements 9, 11 are joined together by a link corresponding to the link 45 in FIG 2.

With the double scissor-arm assembly illustrated in FIGS. 1 and 2, a common, complementary movement of the respective scissor elements 8, 10 and 9, 11 in each vertical plane is provided for by means of an arm 15, which extends between a lower portion of an arm 10', extending downwardly from an intermediate portion of the connection arm 12', and an unnumbered link which extends upwardly from an intermediate portion of the corresponding interconnecting arm that extends through the support point 13 in a direction perpendicular to the plane of the drawing as viewed in FIG. 1.

A brush support member designated generally at 106 is supported on an upper end of the upper rod 8 of the scissor member 8, 10, and in the embodiment shown in FIG. 1 is also supported by the upper end of the rod 9 of the scissor member 9, 11. In particular, a pair of opposed, symmetrically disposed links 26, 27 are carried at their upper ends by the corresponding links (e.g., link 45) that join the corresponding upper rods of the respective scissor elements 8, 10 and 9, 11. Corresponding lower ends of the links 26 and 27 are joined to respective outer ends of a pair of horizontal arms 25, 25, whose inner ends are respectively affixed to a vertically disposed cylinder 24 of the brush holder assembly 106. As indicated in FIG. 1, the links 26 and 27 are so disposed that they converge toward an apex point (not shown) which is disposed above the vertex defined by the converging upper scissor rods 8, 9.

A piston 23 is supported for vertical movement within the cylinder 24. The piston 23 is connected to a piston rod 107, which extends through an upper guide 20' of the cylinder 24 to terminate in a container 21. The container, in turn, has coaxially disposed therein a movable rod element 19, whose lower end extends upwardly through a guide 20 on the upper portion of the container 21 and whose lower end is resiliently carried above the bottom surface of the container 21 by means of a spring 22. For this purpose, the lower end of the spring 22 rests against the bottom of the container 21, while an upper end thereof bears against an integral plate member 19' for urging the rod 19 in an upward direction.

The upper end of the rod 19 carries a solid transverse rod 4, whose transversely opposed ends carry individual brushes 5, 6 for contact with the lower surface of the overhead guide conductor 7.

For optimum operation of the pantograph 101, the contact pressure of the brushes 5 and 6 on the rail 7 should be maintained within a predetermined range irrespective of inevitable changes in the height of the conductor 7 above the vehicle to be powered by the pantograph 101. In order to compensate for the relatively high-frequency variations of contact pressure of the brushes against the overhead rail during normal operation, a sensing element 28 which may be of piezoelectric or other conventional design, is associated with the brushes 5 and 6 and carried on the arm 4 for generating a first analog electrical indication. Such indication is proportional to the instantaneous contact pressure of the brushes on the overhead rail.

The relatively high-frequency contact pressure changes represented by the first indication are coupled via a conductor 28' to a first input of a comparison circuit 29. A reference signal generator 111, which yields a second electrical indication representative of a desired value of contact pressure to be maintained, is coupled to a second input of the comparison circuit 29. The circuit 29 functions in a conventional manner to generate, on an analog basis, a third electrical indication on a line 32, such third indication being proportional to the difference between the first and second indications.

The indication on the line 32 serves as a regulating signal for a hydraulic controller 112, which translates variations of the third indication on the line 32 into incremental movements of the piston 23 of the brush holder assembly 106, whereby the resultant movement of the piston rod 107 and thereby the rod 19 in a vertical plane will correspondingly adjust the contact pressure of the brushes 5 and 6 on the overhead wire 11.

For this purpose, the controller 112 includes a regulatable valve 33, which controls the conduction of hydraulic pressure from a source 42 to the interior of the cylinder 24 of the brush support assembly 106. In particular, a hydraulic pump 41 is associated with the hydraulic supply 42 for conducting fluid over lines 40, 38 to the inlet of the valve 33, while the outlet of the valve 33 is routed via conductor 34 to the cylinder 24 as shown.

A regulation input of the valve 33 is connected to the output line 32 of the comparison circuit 29 for receiving the above-mentioned third indication. Consequently, the flow of hydraulic fluid in the line 34, and thereby the movement of the piston 23, will be incrementally varied in accordance with changes in the third indication on the line 32.

While the regulation scheme described above for the brush support member 106 is generally satisfactory for maintaining the brush contact pressure within the desired range under normal conditions, the invention further contemplates that a low-frequency auxiliary correction be applied to the brush contact pressure by effecting an incremental vertical movement of the scissor assembly which carries the brush support assembly 106. Such auxiliary correction is useful, e.g., when the instantaneous variations of brush contact pressure are of sufficient amplitude to exceed the response capability of the portion of the hydraulic controller 112 so far described.

To instrument such low-frequency auxiliary correction, a second piston-cylinder set 121 including a piston 122 and a cylinder 16 is provided for moving the corresponding lower portions of the lower scissor arms 10, 11 through a controllable horizontal distance to correspondingly urge the upper portions of the upper rods 8 and 9 through a proportional vertical distance, thereby providing a second component of pressure variation of the brushes 5, 6 on the wire 7. For this purpose, a piston rod 17 extending horizontally from the piston 122 is affixed to a link 11' which extends upwardly from the interconnecting arm (not shown) between the corresponding rods 11, 11 above the support point 13. A spring member 18, in turn, is connected between the cylinder 16 and a corresponding link which extends upwardly intermediate the lower rods 10 of the scissor elements 8, 10 above the support point 12. The purpose of the spring 18 is to assure that, in the event that the hydraulic system fails, the scissor members of the pantograph will be urged in an upward direction to help maintain brush contact pressure against the rail 7. (In a corresponding manner, the upward force provided by the spring 22 in the brush holder assembly 106 will urge the brush-carrying arm 4 upward to help maintain such brush contact pressure in the event of failure of the hydraulic system to the cylinder 24).

In order to hydraulically drive the piston-cylinder set 121, the hydraulic controller 112 is further provided with an auxiliary hydraulic path between the line 40, coupled to the source 42 and pump 41, and the interior of the cylinder 16. Such auxiliary path includes a line 39, a second controllable valve 36, and a line 37.

In order to regulate the valve 36 in a manner that provides the desired low-frequency auxiliary correction to the movement of the scissor arms of the pantograph 101, the high-frequency third indication on the line 32 is further coupled to a circuit 131, which has facilities for deriving from such third indication a fourth low-frequency control indication representative, e.g., of the average value of the high-frequency variations of the third indication.

The generated fourth indication is coupled over a line 35 from the circuit 131 to a control input of the valve 36. As a result, the movement of the piston 122, and thereby the vertical movement of the scissor rods 8 and 9, will incrementally follow the changes in the low-frequency fourth indication on the line 35.

Advantageously, the circuit 131 may also be provided with suitable auxiliary facilities to effect movement of the pantograph scissor members when the peak amplitude of the high-frequency variations picked up by the sensing member 28 in the brush support member 106 exceeds a predetermined value as reflected by a corresponding amplitude on the line 32. Such value may be selected, for example, to trigger on the low-frequency correction facilities when the response of the hydraulic servosystem to the high-frequency variations sensed at the brush support member 106 falls below a minimum acceptable value. Such condition, in turn, will occur as the instantaneous variations of the brush contact pressure become excessively large.

Figure 3:
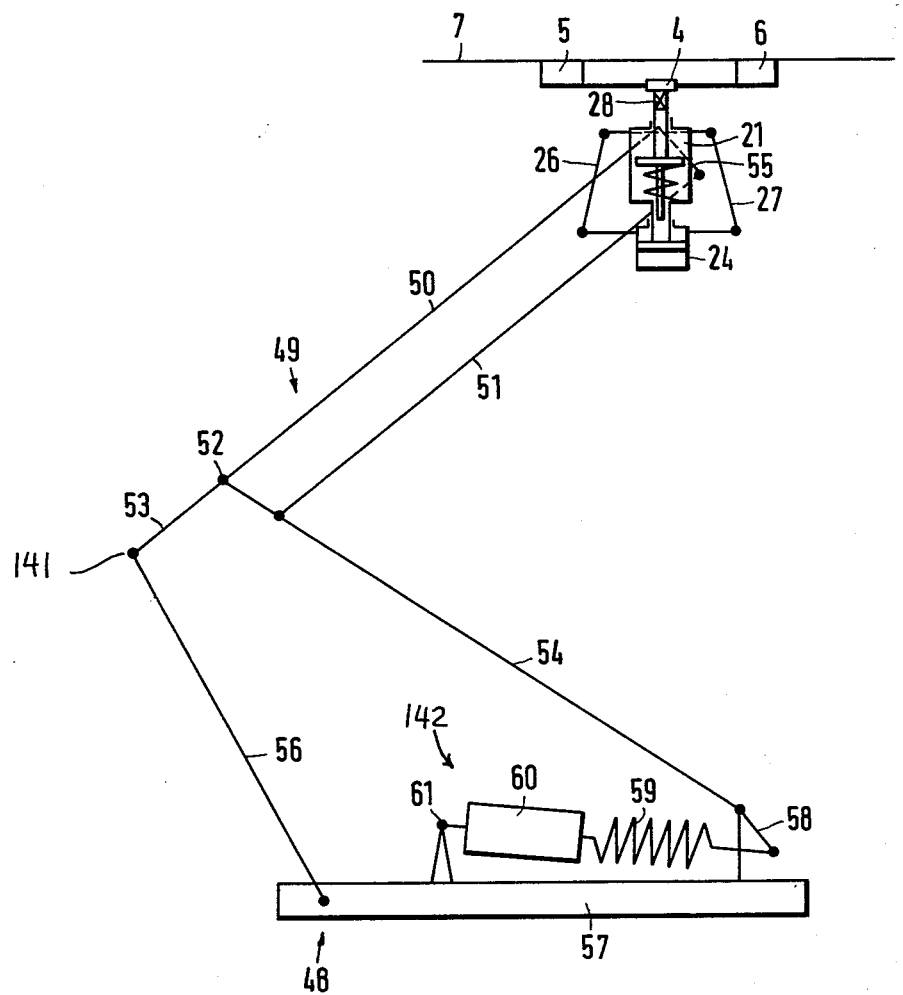
FIG. 3 is a side view of a second form of pantograph assembly having facilities in accordance with the invention for regulating brush contact pressure.

An alternative form of the pantograph scissor members suitable for use with the above-described contact pressure control arrangement is shown schematically in FIG. 3. In this case, the scissor elements are provided only on one side of a vertical axis passing through the path of movement of the brush support assembly 106. The illustrated scissor portion may include an upper rod 50 and a lower rod 56 connected to a common pivot point 141. An arm 52, which may connect a lower portion of the upper rod 50 with a corresponding portion of an additional and unillustrated upper rod of a corresponding scissor assembly, is linked at an intermediate point thereof to a control rod 54 which, via a link 58, translates an essentially horizontal movement of a piston-cylinder set 142 into a corresponding vertical movement of the upper end of the rod 50.

A cylinder 60 of the set 142 may be affixed at one end to a standard 61 which rests on a support member 48, corresponding to the support member 14 of FIG. 1. Another portion of the cylinder 60 is associated with a spring 59, which corresponds to the spring 18 of FIG. 1.

An arm 51 extends from an upper portion of the control rod 54 to provide a second support point for the brush support assembly 106.

The particular arrangement of arms of the pantograph assembly in FIG. 3, like the pantograph embodiment shown in FIGS. 1–2, are well-known in the art and have been described herein solely to provide the required environment of the brush contact regulation scheme of the invention. Thus, it will be understood that the various modes of movement of the brush support assembly 101 and the various scissor elements, together with their hydraulic control via the first, second, third and fourth indications described in connection with FIGS. 1–2, are equally applicable to the arrangement of FIG. 3.

An improved regulation characteristic may be obtained if, instead of employing an invariant second reference indication from the generator 111 (FIG. 1), such indication is permitted to track changes in speed of the vehicle. For this purpose, the generator 111 may be made adjustable, with its output amplitude proportional to changes in speed as sensed, e.g., by a velocity detector 151 associated with and adapted to conventionally sense the instantaneous vehicle speed. For convenience, the detector 151, which may be embodied as a tachometer, is shown associated with the support member 14 affixed to the vehicle roof. A relatively low value of proportionality constant between input changes in speed and output changes in amplitude of the second indication has been found adequate. In such case, the reference generator 111 may be adapted to normally generate a constant value of voltage, upon which is superimposed a variable component proportional to the output voltage of the detector 151.

In the foregoing, some illustrative arrangements of the invention have been described. Many variations and modifications will now occur to those skilled in the art. For example, the upper rods of the coupled scissor elements for the arrangement of FIG. 3 need not be parallel, as in FIG. 2, but may be laid out in a trapezoidal pattern, with the interconnecting arm 52 constituting one of the parallel elements of such trapezoid. Also, if desired, the hydraulic facilities illustrated in FIG. 1 may be replaced by pneumatic facilities. It is accordingly desired that the scope of the appended claims not be limited to the specific disclosure herein contained.

What is claimed is:

1. In a pantograph assembly supportable on an electric vehicle and associated with a brush adapted for wiping contact with an overhead conductor to convey drive power to the vehicle, the assembly comprising a frame including at least one scissor member having a first and a second rod disposed in a vertical plane, a lower end of the first rod being linked to an upper end of the second rod so that an upper end of the first rod moves in a vertical plane when a lower end of the second rod is moved along a horizontal path, a brush support assembly supporting the brush for movement in a vertical plane, the brush support assembly including a vertically oriented first cylinder supported by the upper end of the first rod and a first piston movable in the first cylinder, a first piston rod having a lower end affixed to the first piston and an upper end coupled to the brush sensor means associated with the brush for generating a first relatively high-frequency electrical indication proportional to variations in the instantaneous contact pressure of the brush on the overhead conductor, means for generating a variable second reference electrical indication indicative of a desired value of such contact pressure, comparison means coupled to the sensor means and to the second indication-generating means for generating a third indication proportional to the difference between the first and second indications, first control means coupled to the output of the comparison means for incrementally moving the first piston in accordance with changes in the third indication to compensate for changes in the contact pressure of the brush on the overhead conductor, means coupled to the output of the comparison means and responsive to the third indication for deriving a relatively low-frequency fourth indication therefrom, a second horizontally disposed cylinder carried by the vehicle, a second piston movable within the second cylinder, a second piston rod coupled to the second piston for imparting horizontal movement to the lower end of the second rod of the scissor member, and second control means coupled to the output of the deriving means for incrementally moving the second piston in accordance with changes in the fourth indication.

2. A pantograph assembly as defined in claim 1, further comprising resilient means associated with the first cylinder for normally urging the first piston rod in an upward direction.

3. A pantograph assembly as defined in claim 1, further comprising resilient means associated with the second cylinder for normally urging the second piston rod in a horizontal direction corresponding to an upward movement of the upper end of the first rod in the scissor member.

4. A pantograph assembly as defined in claim 1, in which the second indication-generating means comprises means coupled to the vehicle for varying the magnitude of the second indication in proportion to the speed of the vehicle.

5. A pantograph assembly as defined in claim 1, in which the assembly includes a pair of the scissor members, the first rods of each scissor member extending symmetrically and diagonally upwardly on both sides of the path of movement of the brush support means to converge at a vertex, and in which the brush support means further comprises, in combination, a pair of spaced links disposed in upwardly converging relation on opposite sides of the path of movement of the brush support means toward an apex point above the vertex of the converging first rods of the scissor members, means for coupling the upper ends of the respective links to the upper portions of the first rods, and means for affixing opposed sides of the first cylinder to the lower ends of the links.

6. In a method of regulating the contact pressure, on an overhead conductor, of a pantograph brush adapted for adjustable electrical wiping contact with the conductor, wherein the brush is supported for vertical movement in a brush support which in turn is supported for vertical movement via a scissors member of the pantograph, the steps of continually generating a first relatively high-frequency electrical indication proportional to the instantaneous electrical contact pressure of the brush on the wire, generating a second reference indication proportional to a desired value of the contact pressure, generating a third indication proportional to the difference between the first and second indications, adjusting the vertical movement of the brush in the brush support in accordance with the magnitude of the third indication, deriving from the third indication a fourth relativey low-frequency indication, and separately adjusting the vertical movement of the brush support in accordance with the magnitude of the fourth indication.

7. A method as defined in claim 6, in which the deriving step commences when the amplitude of the third indication exceeds a predetermined value.

8. A method as defined in claim 6, in which the pantograph member is supported on a moving vehicle, and in which the method further comprises the steps of adjusting the magnitude of the second indication in proportion to the speed of the vehicle.

* * * * *